(12) United States Patent
Nishino

(10) Patent No.: US 9,120,522 B1
(45) Date of Patent: Sep. 1, 2015

(54) BICYCLE HYDRAULIC OPERATING DEVICE AND BICYCLE HYDRAULIC DEVICE ASSEMBLY

(71) Applicant: SHIMANO INC., Sakai (JP)

(72) Inventor: Takafumi Nishino, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 14/284,365

(22) Filed: May 21, 2014

(51) Int. Cl.
    *B62K 19/00* (2006.01)
(52) U.S. Cl.
    CPC ...................... *B62K 19/00* (2013.01)
(58) Field of Classification Search
    CPC ..................................................... B62L 3/023
    See application file for complete search history.

(56) References Cited

U.S. PATENT DOCUMENTS

| | | | | |
|---|---|---|---|---|
| 2004/0163897 | A1* | 8/2004 | Becocci et al. | 188/24.22 |
| 2009/0031841 | A1* | 2/2009 | Tetsuka | 74/473.12 |
| 2012/0240715 | A1* | 9/2012 | Tsai | 74/504 |
| 2012/0241261 | A1* | 9/2012 | Tsai | 188/24.21 |
| 2013/0255239 | A1* | 10/2013 | Miki | 60/325 |
| 2014/0144275 | A1* | 5/2014 | Kariyama et al. | 74/488 |
| 2015/0001018 | A1* | 1/2015 | Kariyama et al. | 188/344 |

* cited by examiner

*Primary Examiner* — Kevin Hurley
(74) *Attorney, Agent, or Firm* — Mori & Ward, LLP

(57) ABSTRACT

A bicycle hydraulic operating device comprises a bracket and a hydraulic unit. The bracket is configured to be mounted to a bicycle handlebar and includes a mounting surface contactable with the bicycle handlebar. The hydraulic unit is provided at the bracket to at least partially protrude from the mounting surface toward the bicycle handlebar in a state where the bracket is mounted to the bicycle handlebar.

12 Claims, 4 Drawing Sheets

BICYCLE HYDRAULIC OPERATING DEVICE AND BICYCLE HYDRAULIC DEVICE ASSEMBLY

BACKGROUND OF THE INVENTION

1. Field of the Invention

The present invention relates to a bicycle hydraulic operating device and a bicycle hydraulic device assembly.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle hydraulic component that has been extensively redesigned is a bicycle operating device.

SUMMARY OF THE INVENTION

In accordance with a first aspect of the present invention, a bicycle hydraulic operating device comprises a bracket and a hydraulic unit. The bracket is configured to be mounted to a bicycle handlebar and includes a mounting surface contactable with the bicycle handlebar. The hydraulic unit is provided at the bracket to at least partially protrude from the mounting surface toward the bicycle handlebar in a state where the bracket is mounted to the bicycle handlebar.

In accordance with a second aspect of the present invention, the bicycle hydraulic operating device according to the first aspect is configured so that the hydraulic unit includes a banjo attachment portion to which a banjo is to be attached. The banjo attachment portion is provided on an opposite side of the bracket with respect to the mounting surface.

In accordance with a third aspect of the present invention, the bicycle hydraulic operating device according to the second aspect is configured so that the hydraulic unit includes a banjo attachment bolt configured to connect the banjo to the banjo attachment portion. The banjo attachment bolt is configured to clamp the bicycle handlebar together with the mounting surface of the bracket.

In accordance with a fourth aspect of the present invention, the bicycle hydraulic operating device according to the first aspect is configured so that the mounting surface has a curved shape.

In accordance with a fifth aspect of the present invention, the bicycle hydraulic operating device according to the first aspect is configured so that the hydraulic unit includes a hydraulic cylinder and a piston movably disposed in the hydraulic cylinder. The hydraulic cylinder at least partially protrudes from the mounting surface toward the bicycle handlebar.

In accordance with a sixth aspect of the present invention, the bicycle hydraulic operating device according to the fifth aspect is configured so that the hydraulic cylinder includes a cylinder bore in which the piston is movably disposed. The cylinder bore is at least partially provided on an opposite side of the bracket with respect to the mounting surface.

In accordance with a seventh aspect of the present invention, the bicycle hydraulic operating device according to the first aspect is configured so that the bracket includes a proximal end portion, a distal end portion, and a gripping portion. The proximal end portion has the mounting surface. The distal end portion is away from the proximal end portion. The gripping portion is arranged between the proximal end portion and the distal end portion so as to be gripped by a rider.

In accordance with an eighth aspect of the present invention, the bicycle hydraulic operating device according to the seventh aspect further comprises a first operating member movably coupled to the distal end portion to operate the hydraulic unit.

In accordance with a ninth aspect of the present invention, the bicycle hydraulic operating device according to the eighth aspect further comprises a shift unit arranged at one of the first operating member and the bracket.

In accordance with a tenth aspect of the present invention, the bicycle hydraulic operating device according to the ninth aspect is configured so that the first operating member is configured to pivot in a first direction to operate the hydraulic unit and in a second direction which differs from the first direction to operate the shift unit.

In accordance with an eleventh aspect of the present invention, the bicycle hydraulic operating device according to the ninth aspect further comprises a second operating member configured to operate the shift unit.

In accordance with a twelfth aspect of the present invention, the bicycle hydraulic operating device according to the eleventh aspect is configured so that the first operating member is configured to pivot in a first direction to operate the hydraulic unit. The second operating member is configured to pivot in a second direction which differs from the first direction to operate the shift unit.

In accordance with a thirteenth aspect of the present invention, a bicycle hydraulic device assembly comprises the bicycle hydraulic operating device according to any one of the first to twelfth aspects, and a bicycle handlebar. The bicycle handlebar includes a mounting opening through which the hydraulic unit protrudes into the bicycle handlebar.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
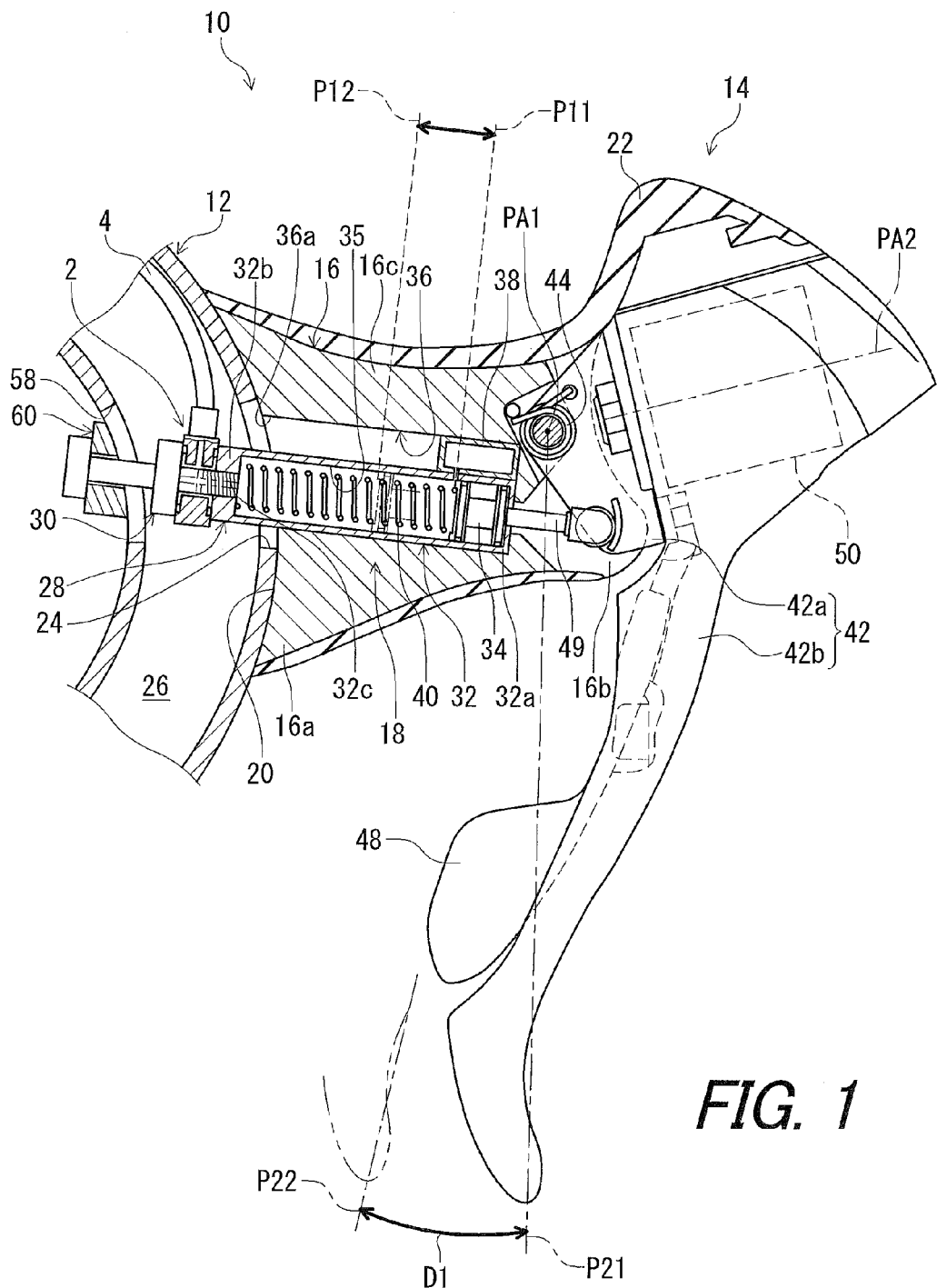
FIG. 1 is a cross-sectional view of a bicycle hydraulic device assembly in accordance with an embodiment.

The embodiments will now be described with reference to the accompanying drawings, wherein like reference numerals designate corresponding or identical elements throughout the various drawings.

Referring initially to FIG. 1, a bicycle hydraulic device assembly 10 in accordance with an embodiment comprises a bicycle handlebar 12 and a bicycle hydraulic operating device 14. In the illustrated embodiment, for example, the bicycle handlebar 12 is a drop handlebar. The bicycle handlebar 12 can have a shape other than the drop handlebar if needed and/or desired. The bicycle hydraulic operating device 14 is mounted to the bicycle handlebar 12 as a right control device configured to be operated by a rider's right hand. Structures of the bicycle hydraulic operating device 14 can be applied to a left control device configured to be operated by a rider's left hand. The bicycle hydraulic operating device 14 can be mounted to a bicycle handlebar other than the drop handlebar if needed and/or desired.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle of a bicycle with facing the bicycle handlebar 12. Accordingly, these terms, as utilized to describe the bicycle hydraulic operating device 14, should be interpreted relative to the bicycle equipped with the bicycle hydraulic operating device 14 as used in an upright riding position on a horizontal surface.

As seen in FIG. 1, the bicycle hydraulic operating device 14 comprises a bracket 16 and a hydraulic unit 18. The bracket 16 is configured to be mounted to the bicycle handlebar 12. The bracket 16 includes a mounting surface 20 contactable with the bicycle handlebar 12. In more detail, the bracket 16 includes a proximal end portion 16a having the mounting surface 20, a distal end portion 16b being away from the proximal end portion 16a, and a gripping portion 16c arranged between the proximal end portion 16a and the distal end portion 16b so as to be gripped by the rider. The hydraulic unit 18 is provided at the bracket 16 to at least partially protrude from the mounting surface 20 toward the bicycle handlebar 12 in a state where the bracket 16 is mounted to the bicycle handlebar 12. The mounting surface 20 has a curved shape to fit a curved drop portion of the bicycle handlebar 12 and a round-shaped outer peripheral surface (FIG. 4) of the bicycle handlebar 12. The mounting surface 20 is provided along the bicycle handlebar 12. The mounting surface 20 can have a shape other than the curved shape if needed and/or desired.

The bicycle hydraulic operating device 14 includes a cover 22. The cover 22 is configured to at least partially cover the bracket 16. For example, the cover 22 is made of a non-metallic material such as rubber, and the bracket 16 is made of a metallic material. The bracket 16 can be made of a non-metallic material if needed and/or desired. The cover 22 can be omitted from the bicycle hydraulic operating device 14 if needed and/or desired.

The bicycle handlebar 12 includes a mounting opening 24 through which the hydraulic unit 18 protrudes into the bicycle handlebar 12 in the state where the bracket 16 is mounted to the bicycle handlebar 12. The bicycle handlebar 12 has a tubular shape and includes an inner space 26. The hydraulic unit 18 is at least partially arranged at the inner space 26 of the bicycle handlebar 12 in the state where the bracket 16 is mounted to the bicycle handlebar 12.

The hydraulic unit 18 includes a banjo attachment portion 28 to which a banjo 2 is to be attached. The banjo attachment portion 28 is provided on an opposite side of the bracket 16 with respect to the mounting surface 20. The hydraulic unit 18 includes a banjo attachment bolt 30 configured to connect the banjo 2 to the banjo attachment portion 28.

The hydraulic unit 18 includes a hydraulic cylinder 32 and a piston 34 movably disposed in the hydraulic cylinder 32. The hydraulic cylinder 32 at least partially protrudes from the mounting surface 20 toward the bicycle handlebar 12. In other words, the hydraulic cylinder 32 is at least partially arranged at the inner space 26 of the bicycle handlebar 12. The hydraulic cylinder 32 is secured to the bracket 16. In other words, the hydraulic cylinder 32 is fixedly mounted on the bracket 16.

The hydraulic cylinder 32 includes a cylinder bore 35 in which the piston 34 is movably disposed. The cylinder bore 35 is at least partially provided on an opposite side of the bracket 16 with respect to the mounting surface 20. In other words, the cylinder bore 35 is at least partially arranged at the inner space 26 of the bicycle handlebar 12.

The hydraulic cylinder 32 includes a first end 32a and a second end 32b opposite to the first end 32a. The second end 32b is provided outside the bracket 16. The banjo attachment portion 28 is provided at the second end 32b of the hydraulic cylinder 32. The banjo attachment bolt 30 is configured to connect the banjo 2 to the second end 32b of the hydraulic cylinder 32.

The bracket 16 includes a cavity 36. The hydraulic cylinder 32 is at least partially provided in the cavity 36. The cavity 36 includes an opening 36a provided on the mounting surface 20. The hydraulic cylinder 32 extends through the opening 36a. The opening 36a is disposed to face the mounting opening 24 of the bicycle handlebar 12. The hydraulic cylinder 32 is provided at the bracket 16 to at least partially protrude from the mounting surface 20 through the mounting opening 24 and the opening 36a in the state where the bracket 16 is mounted to the bicycle handlebar 12.

The hydraulic cylinder 32 includes a reservoir 38 and a piston biasing member 40. The reservoir 38 is in fluid communication with the cylinder bore 35 of the hydraulic cylinder 32. The reservoir 38 is secured to the bracket 16. The reservoir 38 is provided in the cavity 36 of the bracket 16. The piston biasing member 40 is provided in the cylinder bore 35. The piston biasing member 40 is configured to bias the piston 34 toward an initial position P11.

In the illustrated embodiment, the hydraulic cylinder 32 is a separate member from each of the reservoir 38 and the bracket 16. The reservoir 38 is a separate member from the bracket 16. At least one of the hydraulic cylinder 32 and the reservoir 38 can, however, be provided integrally with the bracket 16 as a single unitary member if needed and/or desired.

The bicycle hydraulic operating device 14 further comprises a first operating member 42, a biasing member 44, and a second operating member 48. In the illustrated embodiment, the first operating member 42 is configured as an operating lever. The first operating member 42 includes a support portion 42a and a lever portion 42b. The support portion 42a is configured to be pivotable relative to the bracket 16 about a first pivot axis PA1 to operate the hydraulic unit 18. The lever portion 42b is coupled to the bracket 16 via the support portion 42a so as to pivot in a first direction D1 together with the support portion 42a. Thus, the first operating member 42 is configured to pivot in the first direction D1 between a rest position P21 and an operated position P22 to operate the hydraulic unit 18. Further, the lever portion 42b is configured to be pivotable relative to the support portion 42a about a second pivot axis PA2 so as to pivot in a second direction D2 (FIG. 4) which differs from the first direction D1 to operate a shift unit 50 (described below). In other words, the first operating member 42 is configured to pivot in the second direction D2 to operate the shift unit 50. In the illustrated embodiment, the second pivot axis PA 2 is perpendicular to the first pivot axis PA 1. The first operating member 42 pivots along a first path in the first direction D1 and the first operating member 42 pivots along a second path in the second direction D2. The second path is perpendicular to the first path (not shown). The biasing member 44 is configured to bias the first operating member 42 relative to the bracket 16 toward the rest position P21. The second operating member 48 is provided on the first operating member 42 so as to pivot in the first direction D1 together with the first operating member 42. Further, the second operating member 48 is configured to be pivotable relative to the first operating member 42 about the second pivot axis PA2 so as to pivot in the second direction D2 to operate the shift unit 50. In the illustrated embodiment, the second operating member 48 is configured as an operating lever.

The support portion 42a is operatively connected to the piston 34 by a connecting rod 49. The piston 34 is positioned at the initial position P11 in a state where the first operating member 42 is positioned at the rest position P21. The piston 34 is positioned at an actuated position P12 in a state where the first operating member 42 is positioned at the operated position P22.

In the present application, the term "rest position" as used herein refers to a position at which a movable part such as the first operating member 42 and the second operating member 48 remains stationary in a state where the movable part is not operated by the user. The term "operated position" as used herein refers to a position at which the movable part has been operated by the user to perform the operation of the bicycle component.

The bicycle hydraulic operating device 14 further comprises the shift unit 50 arranged at one of the first operating member 42 and the bracket 16. In the illustrated embodiment, the shift unit 50 is provided at the support portion 42a of the first operating member 42. The shift unit 50 can be provided at the bracket 16 if needed and/or desired. The shift unit 50 is configured to wind and unwind a control cable (not shown) to operate a bicycle component such as a bicycle transmission via the control cable. Possible examples of the bicycle transmission include a derailleur and an internal-gear hub. The shift unit 50 is configured to wind the control cable in response to pivot movement of the lever portion 42b of the first operating member 42 in the second direction D2. The shift unit 50 is configured to unwind the control cable in response to pivot movement of the second operating member 48 in the second direction D2. An electric shift unit can be applied to the shift unit 50 if needed and/or desired. Since the shift unit 50 includes structures which are well known in the bicycle field, they will not be described and/or illustrated in detail here for the sake of brevity.

Figure 2:
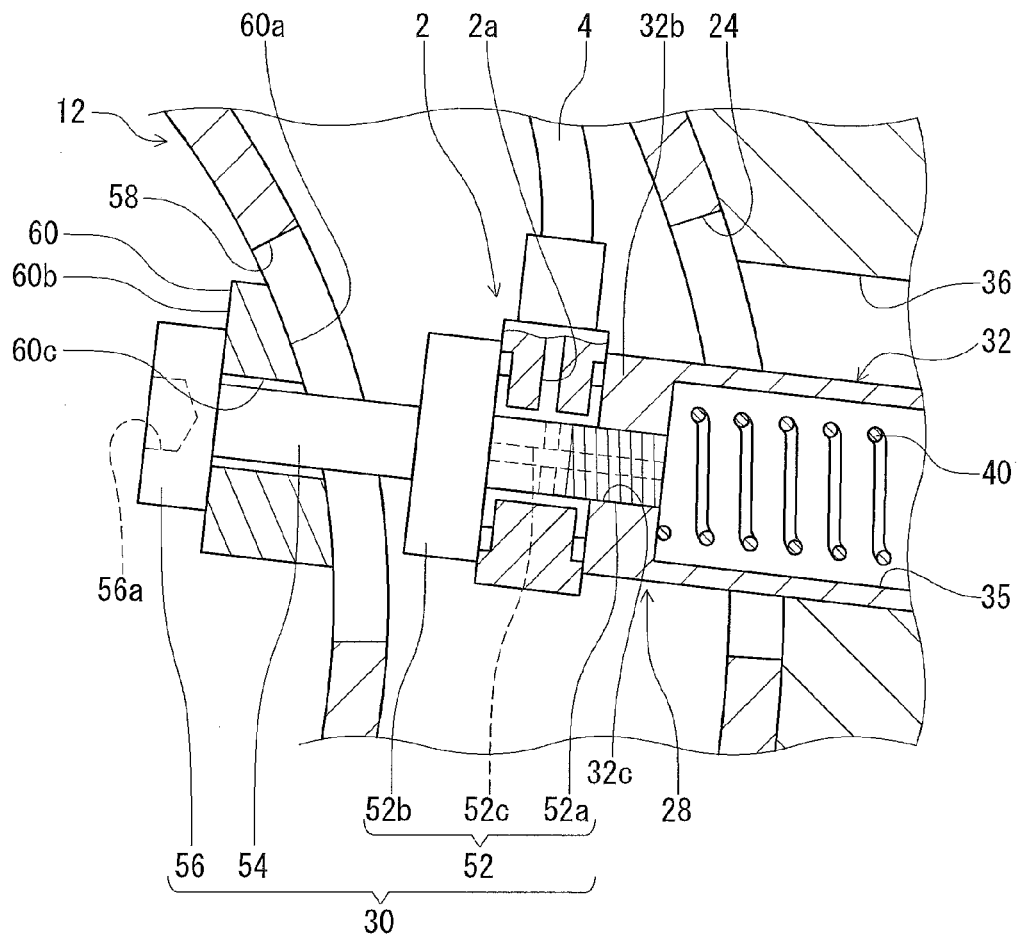
FIG. 2 is a partial enlarged cross-sectional view of the bicycle hydraulic device assembly illustrated in FIG. 1.

As seen in FIG. 2, the banjo attachment bolt 30 is configured to clamp the bicycle handlebar 12 together with the mounting surface 20 of the bracket 16. The banjo attachment bolt 30 does not, however, need to clamp the bicycle handlebar 12 together with the mounting surface 20. The bicycle hydraulic operating device 14 can include a clamp structure such as a clamp band instead of the banjo attachment bolt 30.

As seen in FIG. 2, the hydraulic cylinder 32 includes a threaded hole 32c provided at the second end 32b. The banjo attachment bolt 30 includes a banjo bolt 52, a rod body 54, and a head portion 56. In the illustrated embodiment, the rod body 54 and the head portion 56 are integrally provided with the banjo bolt 52 as a single unitary member. The rod body 54 and the head portion 56 can, however, be a separate member from the banjo bolt 52 if needed and/or desired.

The banjo bolt 52 includes an external thread 52a and a flange part 52b. The external thread 52a is screwed in the threaded hole 32c in a state where the banjo 2 is attached to the hydraulic cylinder 32. The banjo 2 is provided between the flange part 52b and the banjo attachment portion 28 in a state where the external thread 52a is screwed in the threaded hole 32c. In the illustrated embodiment, the flange part 52b is entirely provided in the bicycle handlebar 12. The banjo bolt 52 includes a fluid passage 52c configured to fluidly connect a fluid passage 2a of the banjo 2 to the cylinder bore 35. The banjo 2 is fluid communication with a bicycle component such as a hydraulic brake caliper via a hydraulic hose 4.

The rod body 54 extends from the banjo bolt 52 (more specifically, from the flange part 52b). The rod body 54 at least partially protrudes from the bicycle handlebar 12 in a state where the bicycle hydraulic operating device 14 is mounted to the bicycle handlebar 12. The bicycle handlebar 12 includes an additional opening 58. The rod body 54 extends through the additional opening 58 in a state where the bicycle hydraulic operating device 14 is mounted to the bicycle handlebar 12. The head portion 56 is provided at an end of the rod body 54. The head portion 56 includes a tool engaging part 56a configured to engage with a tool to tighten or release the banjo attachment bolt 30. The tool engaging part 56a has a hexagon hole, for example.

The bicycle hydraulic operating device 14 includes an intermediate member 60. The intermediate member 60 is provided between the bicycle handlebar 12 and the head portion 56 in a state where the bicycle hydraulic operating device 14 is mounted to the bicycle handlebar 12. Thus, in the illustrated embodiment, the banjo attachment bolt 30 clamps the bicycle handlebar 12 together with the mounting surface 20 via the intermediate member 60. The intermediate member 60 includes a curved surface 60a and a flat surface 60b. The curved surface 60a is configured to contact the bicycle handlebar 12. The curved surface 60a has a shape complementary with an outer surface of the bicycle handlebar. The flat surface 60b is configured to contact the head portion 56.

Figure 3:
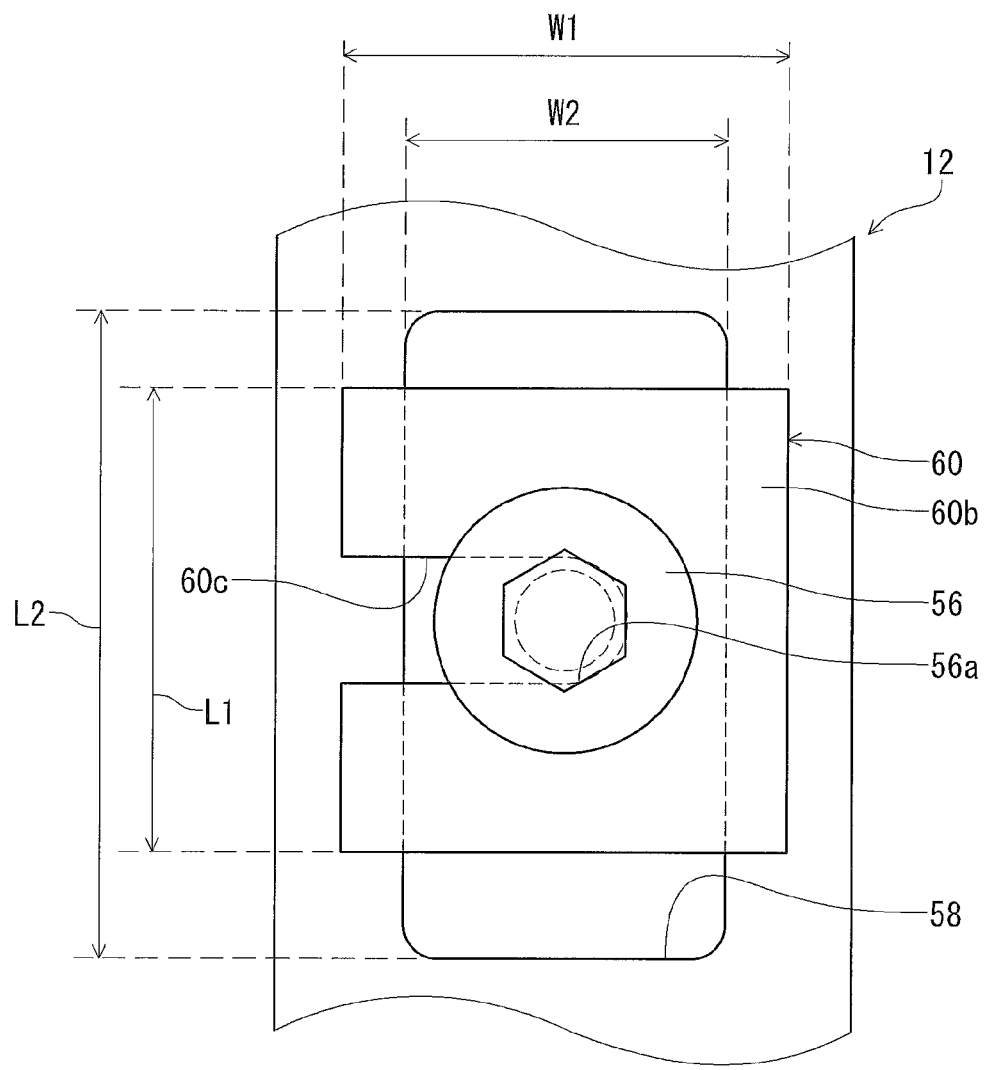
FIG. 3 is a partial elevational view of the bicycle hydraulic device assembly illustrated in FIG. 1.
Figure 4:
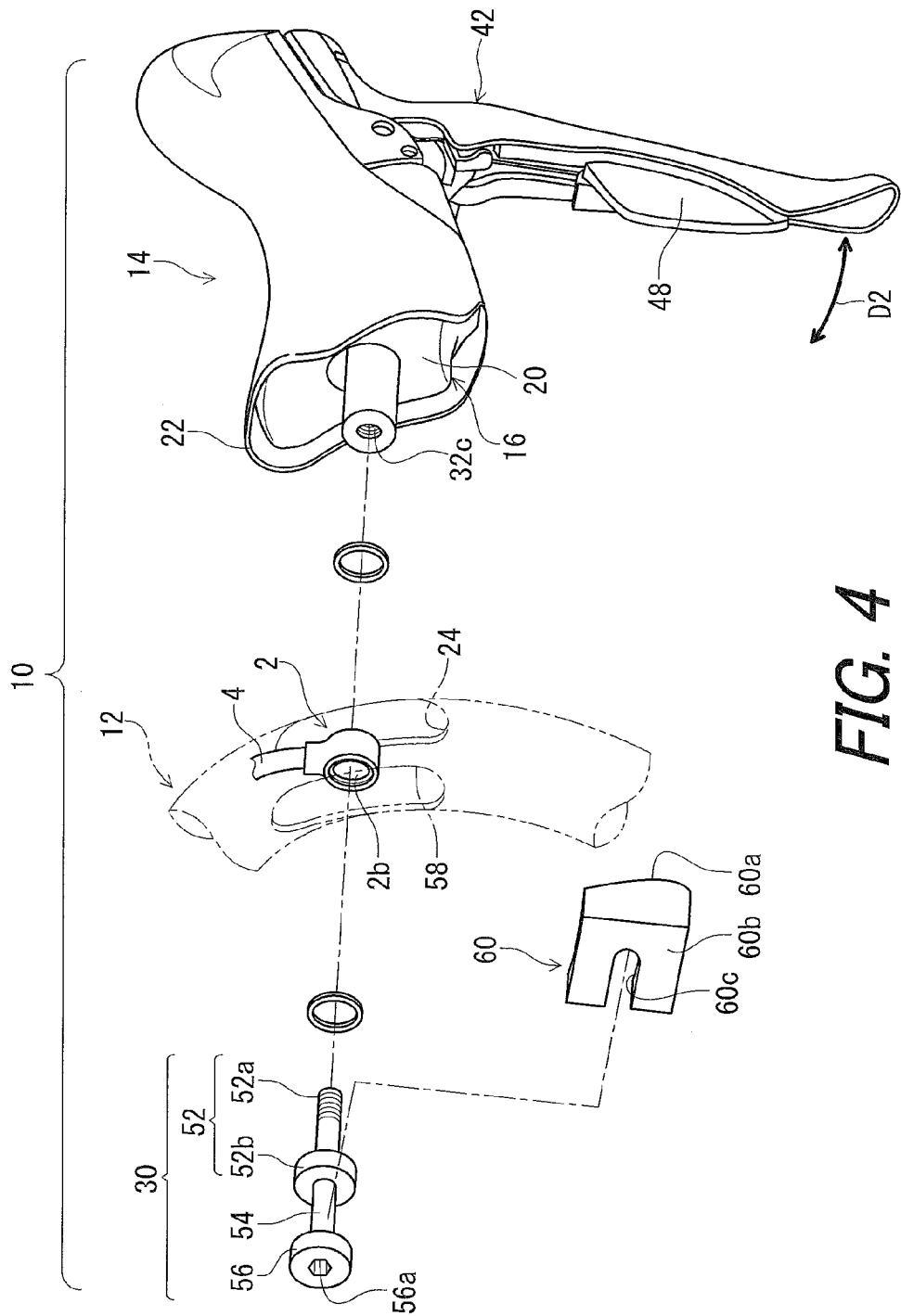
FIG. 4 is an exploded perspective view of the bicycle hydraulic operating device assembly illustrated in FIG. 1.

As seen in FIGS. 3 and 4, the intermediate member 60 includes a slit 60c through which the rod body 54 extends. As see in FIG. 3, the intermediate member 60 has a width W1 larger than a width W2 of the additional opening 58. The intermediate member 60 has a length L1 shorter than a length L2 of the additional opening 58.

The method of assembling the bicycle hydraulic device assembly 10 will be described below referring to FIG. 4. The banjo 2 and the hydraulic hose 4 are inserted into an inside of the bicycle handlebar 12. The intermediate member 60 is attached to the rod body 54 of the banjo attachment bolt 30 through the slit 60c. The banjo bolt 52 of the banjo attachment bolt 30 is inserted into the additional opening 58, an attachment hole 2b of the banjo 2, and the mounting opening 24. The external thread 52a of the banjo attachment bolt 30 is screwed into the threaded hole 32c of the hydraulic cylinder 32 of the hydraulic unit 18 using the tool engaging part 56a of the head portion 56. Tightening the banjo attachment bolt 30 causes the banjo 2 to be attached to the hydraulic cylinder 32 of the hydraulic unit 18. The tightening the banjo attachment bolt 30 also causes the bicycle handlebar 12 to be clamped by the head portion 56 and the bracket 16.

With the bicycle hydraulic operating device 14, the hydraulic unit 18 is provided at the bracket 16 to at least partially protrude from the mounting surface 20 toward the bicycle handlebar 12 in the state where the bracket 16 is mounted to the bicycle handlebar 12. Accordingly, an inside area occupied by the hydraulic unit 18 in the bracket 16 can be smaller than that of a conventional hydraulic unit which is entirely provided inside a bracket. Thus, it is possible to utilize an inside area of the bracket 16 with maintaining the size of the hydraulic unit 18, and/or it is possible to make the bracket 16 more compact with maintaining the size of the hydraulic unit 18.

With the bicycle hydraulic operating device 14, the hydraulic unit 18 is provided at the bracket 16 to at least partially protrude from the mounting surface 20 through the mounting opening 24 in the state where the bracket 16 is mounted to the bicycle handlebar 12. Accordingly, the hydraulic unit 18 can be at least partially disposed inside the bicycle handlebar 12. Thus, it is possible to utilize an inside area of the bracket 16 and an inside area of the bicycle handlebar 12 with maintaining the size of the hydraulic unit 18, and/or it is possible to make the bracket 16 more compact with maintaining the size of the hydraulic unit 18.

In the present application, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also is applied to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle hydraulic operating device comprising:
    a bracket configured to be mounted to a bicycle handlebar and including a mounting surface contactable with the bicycle handlebar; and
    a hydraulic unit provided at the bracket to at least partially protrude from the mounting surface toward the bicycle handlebar in a state where the bracket is mounted to the bicycle handlebar, wherein
    the hydraulic unit includes a hydraulic cylinder and a piston movably disposed in the hydraulic cylinder, and
    the hydraulic cylinder at least partially protrudes from the mounting surface toward the bicycle handlebar.

2. The bicycle hydraulic operating device according to claim 1, wherein
    the mounting surface has a curved shape.

3. The bicycle hydraulic operating device according to claim 1, wherein
    the hydraulic cylinder includes a cylinder bore in which the piston is movably disposed, and
    the cylinder bore is at least partially provided on an opposite side of the bracket with respect to the mounting surface.

4. The bicycle hydraulic operating device according to claim 1, wherein
    the bracket includes
        a proximal end portion having the mounting surface,
        a distal end portion being away from the proximal end portion, and
        a gripping portion arranged between the proximal end portion and the distal end portion so as to be gripped by a rider.

5. The bicycle hydraulic operating device according to claim 4, further comprising:
    a first operating member movably coupled to the distal end portion to operate the hydraulic unit.

6. The bicycle hydraulic operating device according to claim 5, further comprising:
    a shift unit arranged at one of the first operating member and the bracket.

7. The bicycle hydraulic operating device according to claim 6, wherein
    the first operating member is configured to pivot in a first direction to operate the hydraulic unit and in a second direction which differs from the first direction to operate the shift unit.

8. The bicycle hydraulic operating device according to claim 6, further comprising:
    a second operating member configured to operate the shift unit.

9. The bicycle hydraulic operating device according to claim 8, wherein
    the first operating member is configured to pivot in a first direction to operate the hydraulic unit, and
    the second operating member is configured to pivot in a second direction which differs from the first direction to operate the shift unit.

10. A bicycle hydraulic operating device comprising:
    a bracket configured to be mounted to a bicycle handlebar and including a mounting surface contactable with the bicycle handlebar; and
    a hydraulic unit provided at the bracket to at least partially protrude from the mounting surface toward the bicycle handlebar in a state where the bracket is mounted to the bicycle handlebar, wherein
    the hydraulic unit includes a banjo attachment portion to which a banjo is to be attached, and
    the banjo attachment portion is provided on an opposite side of the bracket with respect to the mounting surface.

11. The bicycle hydraulic operating device according to claim 10, wherein
    the hydraulic unit includes a banjo attachment bolt configured to connect the banjo to the banjo attachment portion, and
    the banjo attachment bolt is configured to clamp the bicycle handlebar together with the mounting surface of the bracket.

12. A bicycle hydraulic device assembly comprising:
    the bicycle hydraulic operating device according to any one of claims 1 to 2 and 3 to 9; and
    a bicycle handlebar including a mounting opening through which the hydraulic unit protrudes into the bicycle handlebar.

* * * * *